(No Model.)

S. H. FRANCIS.
VINE CUTTER.

No. 483,627. Patented Oct. 4, 1892.

Witnesses
Chas. A. Ford
Chas. S. Hyer

Inventor
Samuel H. Francis.
By his Attorneys,
C. A. Snow & Co.

UNITED STATES PATENT OFFICE.

SAMUEL H. FRANCIS, OF HOUSTON, TEXAS.

VINE-CUTTER.

SPECIFICATION forming part of Letters Patent No. 483,627, dated October 4, 1892.

Application filed March 8, 1892. Serial No. 424,199. (No model.)

*To all whom it may concern:*

Be it known that I, SAMUEL H. FRANCIS, a citizen of the United States, residing at Houston, in the county of Harris and State of Texas, have invented a new and useful Vine-Cutter, of which the following is a specification.

This invention relates to vine-cutters for the purpose of clearing a ridge, so that the digging of potatoes may be more readily accomplished.

The especial object of this invention is to provide a suitable device of the character set forth, whereby a sweet-potato vine may be severed from the main stalk on each side of a ridge, the parts of the same being of simple and effective construction and operation, conveniently used, and cheaply manufactured.

To this end the invention consists of the novel construction and arrangement of the several parts combined for service, as will be more fully hereinafter described, and pointed out in the claim.

Figure 1:
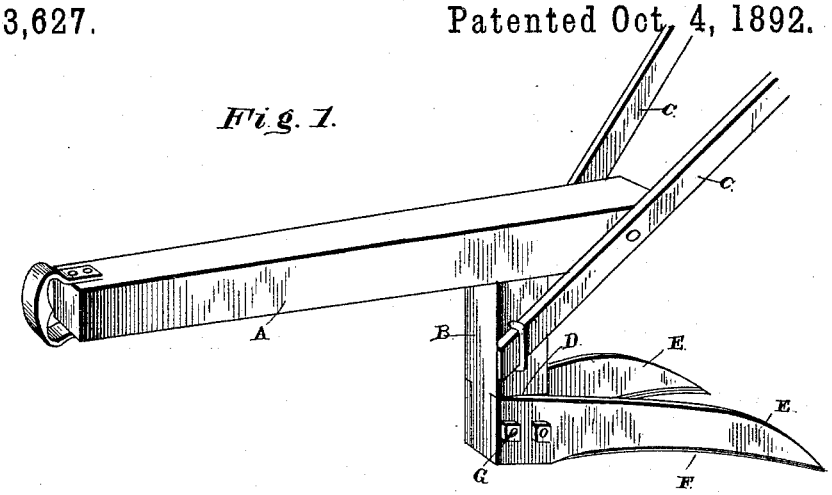
Figure 2:
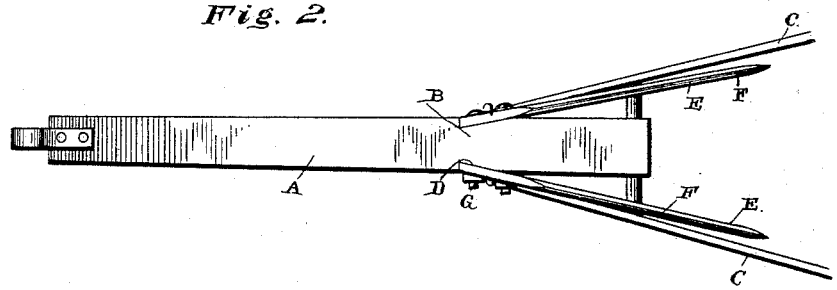
Figure 3:
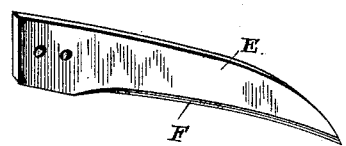

In the drawings, Figure 1 is a perspective view of the improved cutter. Fig. 2 is a bottom plan view thereof. Fig. 3 is a detail perspective view of one of the cutters removed.

Referring to the drawings, A designates a beam, to which is connected a post B, with handle-bars C secured thereto. As shown in the accompanying drawings, the lower end of the post B is recessed, as at D, and receives the forward ends of the cutters E E. Said recesses D are formed in such a manner as to cause the cutters E E to assume a divergent position relatively to each other when they are applied to said post B.

The rear lower portions of the cutters E are concaved and formed with cutting-edges F, and the forward portions of said cutters are connected with the post B by suitable bolts G in a removable manner, so that the same may be readily disconnected and sharpened or otherwise manipulated, as may be desired. The said cutting-edges F of the cutters extend from about the point of attachment of the cutters to the post B to the rear ends of the same, thereby producing a divergent cutting action. By means of this divergent cutting action the vines are severed both close to the ridge and in the ditch between two ridges, thereby providing means for more readily removing the vines after they have been severed.

In operation the cutters are arranged astride of a ridge, and the plow-frame to which they are shown connected, is directed in the ordinary manner over the top of the ridge, the said cutters severing the vines on each side of the ridge, as has already been stated.

It will be observed that the cutters are also projected downward at a slight incline, thereby causing the same to be depressed and sever the vine in the ditches between the ridges.

Having thus described my invention, what I claim as new is—

In a vine-cutter, a post or support, divergent elongated horizontally-arranged cutters secured to the opposite sides thereof and having their lower rear sides formed into cutting-edges of concave form, said cutters being deflected downward at a slight angle of inclination, and means for connecting said cutters to said post, said post being vertically arranged and the cutters being secured to the lower end thereof, substantially as described.

In testimony that I claim the foregoing as my own I have hereto affixed my signature in the presence of two witnesses.

SAMUEL H. FRANCIS.

Witnesses:
G. W. THARP,
CHARLES E. WEAVER.